(12) United States Patent
Borsdorf et al.

(10) Patent No.: US 10,820,504 B2
(45) Date of Patent: Nov. 3, 2020

(54) SYSTEM AND METHOD FOR DETERMINING THE RESIDUE YIELD OF PLANT MATERIALS HARVESTED BY AN AGRICULTURAL HARVESTER

(71) Applicant: CNH Industrial America LLC, New Holland, PA (US)

(72) Inventors: John Borsdorf, Akron, PA (US); Greg Prosser, Downingtown, PA (US)

(73) Assignee: CNH Industrial America LLC, New Holland, PA (US)

( * ) Notice: Subject to any disclaimer, the term of this patent is extended or adjusted under 35 U.S.C. 154(b) by 357 days.

(21) Appl. No.: 16/026,158

(22) Filed: Jul. 3, 2018

(65) Prior Publication Data

US 2020/0008350 A1   Jan. 9, 2020

(51) Int. Cl.
*A01D 41/127* (2006.01)
*A01D 41/12* (2006.01)
(Continued)

(52) U.S. Cl.
CPC ..... *A01D 41/1272* (2013.01); *A01D 41/1243* (2013.01); *A01D 61/00* (2013.01); *A01D 61/02* (2013.01); *A01F 12/10* (2013.01)

(58) Field of Classification Search
CPC .............. A01D 41/1243; A01D 41/127; A01D 41/1271; A01D 41/1272; A01D 61/00; A01D 61/02; A01F 12/10
See application file for complete search history.

(56) References Cited

U.S. PATENT DOCUMENTS

| 5,318,475 A | 6/1994 | Schrock et al. |
| 5,959,257 A | 9/1999 | Campbell et al. |

(Continued)

FOREIGN PATENT DOCUMENTS

| DE | 102008043716 B4 | 6/2012 |
| EP | 0791287 A3 | 7/1998 |

(Continued)

OTHER PUBLICATIONS

Oklahoma State University, Combine Yield Monitors, Yield Mapping, , SOIL 4213 Precision Agriculture, 2013, pp. 44.

(Continued)

*Primary Examiner* — Alicia Torres
(74) *Attorney, Agent, or Firm* — Peter Zacharias; Patrick Sheldrake (57) ABSTRACT

An agricultural harvester may include a system for determining the residue yield of plant materials being ingested by a harvesting implement of the harvester. A controller of the system may be configured to determine the weight of the quantity of plant materials being ingested by a harvesting implement of the harvester based on measurement signals received from the plant yield sensor. The system may be configured to determine the weight of the quantity of crop materials removed from the quantity of harvested plant materials based on measurement signals received from the crop yield sensor. The system may be configured to determine the residue yield value by comparing the determined weight of the quantity of plant materials and the determined weight of the quantity of crop materials.

25 Claims, 6 Drawing Sheets

(51) Int. Cl.
  *A01D 61/00*  (2006.01)
  *A01D 61/02*  (2006.01)
  *A01F 12/10*  (2006.01)

(56) References Cited

U.S. PATENT DOCUMENTS

| | | |
|---|---|---|
| 6,272,819 B1 | 8/2001 | Wendte |
| 6,283,853 B1 | 9/2001 | Pellenc et al. |
| 6,401,549 B1 | 6/2002 | Ohlemeyer |
| 6,525,276 B1 | 2/2003 | Vellidus et al. |
| 6,616,527 B2 | 9/2003 | Shinners et al. |
| 6,951,514 B1 | 10/2005 | Coers et al. |
| 8,347,709 B2 | 1/2013 | Kormann |
| 8,735,745 B2 | 5/2014 | Rossi |
| 9,078,397 B2 * | 7/2015 | Farley .................. A01F 7/02 |
| 9,089,092 B2 | 7/2015 | Dickhans et al. |
| 9,372,109 B2 | 6/2016 | Acheson et al. |
| 9,410,840 B2 | 8/2016 | Acheson et al. |
| 9,625,306 B2 * | 4/2017 | Farley .................. A01F 12/442 |
| 9,668,406 B2 | 6/2017 | Dybro |
| 2012/0253611 A1 | 10/2012 | Zielke et al. |
| 2013/0047750 A1 | 2/2013 | Lambert |
| 2015/0327440 A1 | 11/2015 | Dybro et al. |

FOREIGN PATENT DOCUMENTS

| | | |
|---|---|---|
| EP | 0958729 A1 | 11/1999 |
| EP | 2732693 A2 | 5/2014 |
| EP | 3095314 A1 | 11/2016 |
| EP | 3242257 A1 | 11/2017 |
| WO | WO2010/083823 A1 | 7/2010 |

OTHER PUBLICATIONS

Kumhala et al., Capacitive sensor for chopped maize throughput measurement, Computers and Electronics in Agriculture, Science Direct, vol. 70, Issue 1, Jan. 2010, pp. 234-238. (Abstract Only).
Durrence et al., A Load Cell Based Yield Monitor for Peanut Feasibility Study, Precision Agriculture, Kluwer Academic Publishers, vol. 1 Issue 3, Nov. 1999, p. 301-317. (Abstract Only—7 pages).
University of Nebraska, Yield Monitoring and Mapping, Institute of Agriculture and Natural Resources Cropwatch, 3 pages. https://cropwatch.unl.edu/ssm/mapping.
Hall et al., Evaluation of Sugarbeet Yield Sensing Systems Operating Concurrently on a Harvester, 1997, 12 Pages.
Extended European Search Report for EP Application No. 19183212.0 dated Oct. 28, 2019 (six pages).

* cited by examiner

SYSTEM AND METHOD FOR DETERMINING THE RESIDUE YIELD OF PLANT MATERIALS HARVESTED BY AN AGRICULTURAL HARVESTER

FIELD

The present disclosure generally relates to agricultural harvesters and, more particularly, to systems and methods for determining the residue yield of plant materials being harvested by an agricultural harvester.

BACKGROUND

A harvester is an agricultural machine used to harvest and process crops. For instance, a combine harvester may be used to harvest grain crops, such as wheat, oats, rye, barley, corn, soybeans, and flax or linseed. In general, the objective is to complete several processes, which traditionally were distinct, in one pass of the machine over a particular part of the field. In this regard, most harvesters are equipped with a detachable harvesting implement, such as a header, which cuts and collects plant materials from the field. The harvester also includes a plant processing system, which performs various processing operations (e.g., threshing, separating, etc.) to separate the crops from the other plant materials received from the harvesting implement. The separated crop materials are stored in a crop tank of the harvester, while the remaining residue is discharged from harvester as the harvester is moved across the field.

The yield or amount of the residue discharged from the harvester may impact later farming operations within the field. Specifically, farmers may adjust their tillage, fertilizing, and/or drainage practices based on the amount of residue present within the field to maximize crop growth and productivity. For example, farmers may choose to perform additional tillage on portion of the field in which high levels of residue are present. However, while current harvesters are configured to detect the yield of crop materials entering the crop tank, such harvesters are unable to determine the yield of residue discharged from the harvester.

Accordingly, an improved system and method for determining the residue yield of plant materials being harvested by an agricultural harvester would be welcomed in the technology.

BRIEF DESCRIPTION

Aspects and advantages of the technology will be set forth in part in the following description, or may be obvious from the description, or may be learned through practice of the technology.

In one aspect, the present subject matter is directed to an agricultural harvester. The harvester may include a harvesting implement configured to ingest a quantity of plant materials from a field and a plant processing system configured to process the quantity of harvested plant materials ingested by harvesting implement. The harvester may also include a system for determining a residue yield of the plant materials ingested by the harvesting implement. The system may include a plant yield sensor configured to detect a parameter associated with a weight of the harvested plant materials being ingested by the harvesting implement. Moreover, the system may include a crop yield sensor configured to detect a parameter associated with a weight of a quantity of crop materials removed from the quantity of harvested plant materials by the plant processing system. Furthermore, the system may include a controller communicatively coupled to the plant and the crop yield sensors. The controller may be configured to determine the weight of the quantity of plant materials being ingested by the harvesting implement based on measurement signals received from the plant yield sensor. The controller may also be configured to determine the weight of the quantity of crop materials removed from the quantity of harvested plant materials based on measurement signals received from the crop yield sensor. Additionally, the controller may also be configured to determine a residue yield value by comparing the determined weight of the quantity of plant materials and the determined weight of the quantity of crop materials.

In another aspect, the present subject matter is directed to a method for determining a residue yield of plant material being harvested by an agricultural harvester. The agricultural harvester may include a harvesting implement configured to ingest a quantity of plant materials from a field and a plant processing system configured to process the quantity of harvested plant materials ingested by harvesting implement. The method may include controlling, with a computing device, an operation of the agricultural harvester such that a harvesting implement of the harvester ingests a quantity of plant materials from a field and a plant processing system of the harvester processes the quantity of harvested plant materials ingested by harvesting implement. The method may also include determining, with the computing device, a weight of the quantity of plant materials being ingested by the harvesting implement based on data received from the plant yield sensor. Furthermore, the method may include determining, with the computing device, a weight of a quantity of crop removed from the quantity of harvested plant materials based on data received from the crop yield sensor. Additionally, the method may include determining, with the computing device, a residue yield value by comparing the determined weight of the quantity of plant materials and the determined weight of the quantity of crop.

In a further aspect, the present subject matter is directed to a system for determining a residue yield of the plant materials ingested by a harvesting implement of an agricultural harvester. The system may include a plant yield sensor configured to detect a parameter associated with a weight of the harvested plant materials being ingested by the harvesting implement. The system may also include a crop yield sensor configured to detect a parameter associated with a weight of a quantity of crop materials removed from the quantity of harvested plant materials by a plant processing system of the agricultural harvester. Furthermore, the system may include a controller communicatively coupled to the plant and the crop yield sensors. The controller may be configured to determine the weight of the quantity of plant materials being ingested by the harvesting implement based on measurement signals received from the plant yield sensor. The controller may also be configured to determine the weight of the quantity of crop materials removed from the quantity of harvested plant materials based on measurement signals received from the crop yield sensor. Additionally, the controller may be configured to determine a residue yield value by comparing the determined weight of the quantity of plant materials and the determined weight of the quantity of crop materials.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Repeat use of reference characters in the present specification and drawings is intended to represent the same or analogous features or elements of the present technology.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and methods for determining the residue yield of plant materials being harvested by an agricultural harvester. Specifically, in several embodiments, a controller of the disclosed system may be configured to determine the weight of a quantity of plant materials being ingested by a harvesting implement of the harvester based on measurement signals received from one or more plant yield sensors. For example, in one embodiment, the plant yield sensor(s) may be provided in operative association with one or more conveyors of the harvester implement. In such embodiment, the plant yield sensor(s) may be configured to detect the weight of the harvested plant materials being transported by the conveyor(s). Moreover, the controller may also be configured to determine the weight of the quantity of crop materials removed from the harvested plant materials by a plant processing system of the harvester based on measurement signals received from a crop yield sensor. Thereafter, the controller may be configured to determine the residue yield value of the ingested plant materials by comparing the determined weight of the plant materials and the determined weight of the separated crop materials.

Figure 1:
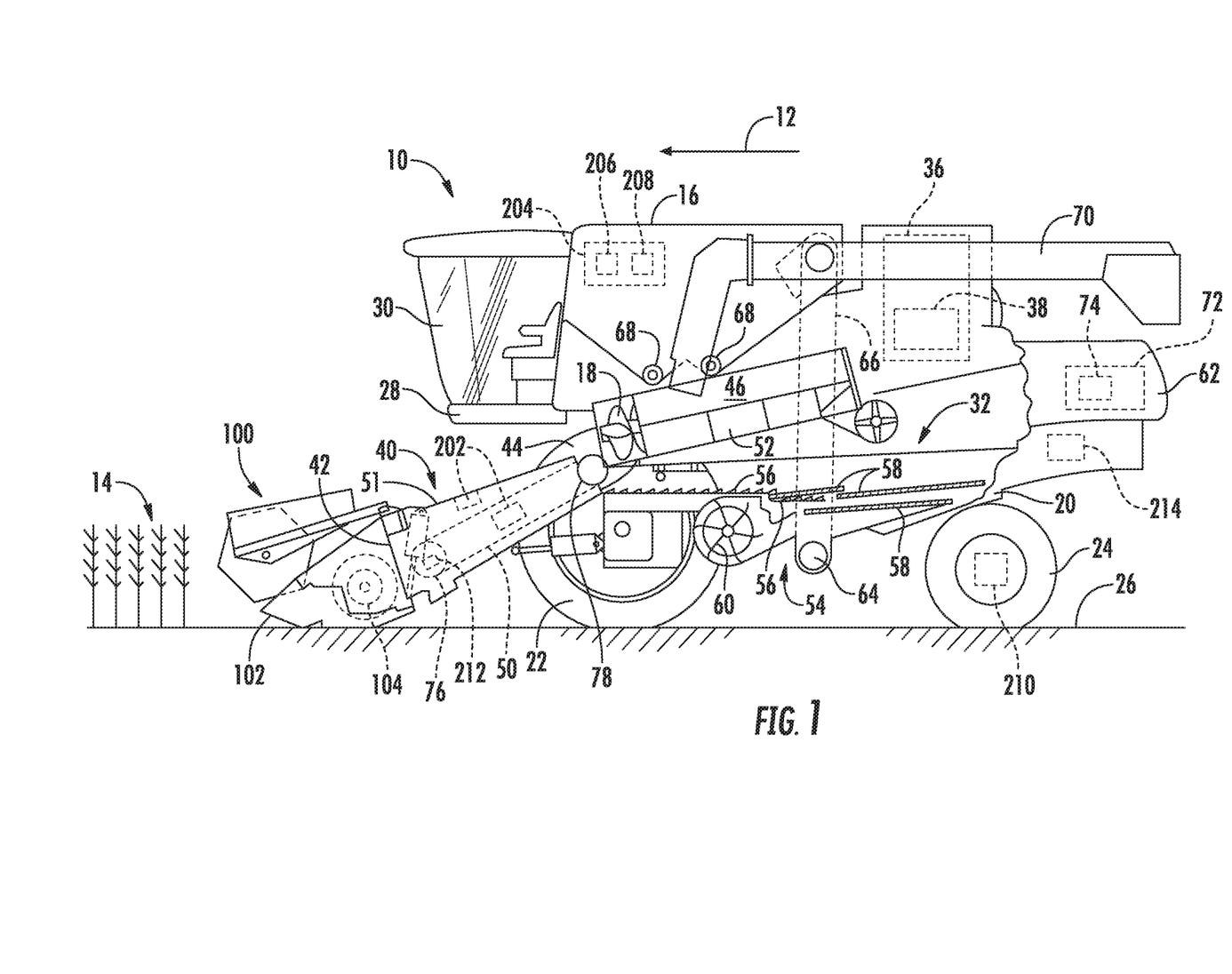
FIG. 1 illustrates a side view of one embodiment of an agricultural harvester in accordance with aspects of the present subject matter.

Referring now to the drawings, FIG. 1 illustrates a partial sectional side view of one embodiment of an agricultural harvester 10 in accordance with aspects of the present subject matter. In general, the harvester 10 may be configured to be moved across a field in a direction of travel (e.g., as indicated by arrow 12) to harvest standing crop 14. While traversing the field, the harvester 10 may be configured to intake and process harvested plant materials from the standing crop 14, thereby separating the crop materials of the harvested plant materials from the associated residue. Thereafter, the harvester 10 may be configured to store the crop materials within a crop tank 16 of the harvester 10 and discharge the remaining residue from the harvester 10. Furthermore, the harvester 10 may be configured to unload the crop materials stored within the crop tank 16 into a crop cart (not shown) or other suitable crop container.

As shown, in one embodiment, the harvester 10 may be configured as an axial-flow type combine, wherein the harvested plant materials are threshed and separated while being advanced by and along a longitudinally arranged rotor 18. However, it should be appreciated that, in alternative embodiments, the harvester 10 may have any suitable harvester configuration.

The harvester 10 may include a chassis or main frame 20 configured to support and/or couple to various components of the harvester 10. For example, in several embodiments, the harvester 10 may include a pair of driven, ground-engaging front wheels 22 and a pair of steerable rear wheels 24 that are coupled to the frame 20. As such, the wheels 22, 24 may be configured to support the harvester 10 relative to a ground surface 26 and move the harvester 10 in the forward direction of travel 12 relative to the ground surface 26. Furthermore, the harvester 10 may include an operator's platform 28 having an operator's cab 30, a plant processing system 32, and the crop tank 16 that are supported by the frame 20. As will be described below, the plant processing system 32 may be configured to perform various processing operations on the harvested plant materials as the plant processing system 32 operates to transfer the harvested plant materials received from a harvesting implement (e.g., header 100) of the harvester 10 through the harvester 10. Additionally, as is generally understood, the harvester 10 may include an engine 36 and a transmission 38 mounted on the frame 20. The transmission 38 may be operably coupled to the engine 36 and may provide variably adjusted gear ratios for transferring engine power to the wheels 22, 24 via a drive axle assembly (or via axles if multiple drive axles are employed).

Moreover, as shown in FIG. 1, the header 100 and an associated feeder 40 of the plant processing system 32 may extend forward of the frame 20 and may be pivotally secured thereto for generally vertical movement. In general, the feeder 40 may be configured to serve as support structure for the header 100. As shown in FIG. 1, the feeder 40 may extend between a front end 42 coupled to the header 100 and a rear end 44 positioned adjacent to a threshing and separating assembly 46 of the plant processing system 32. As is generally understood, the rear end 44 of the feeder 40 may be pivotally coupled to a portion of the harvester 10 to allow the front end 42 of the feeder 40 and, thus, the header 100 to be moved upward and downward relative to the ground 26 to set the desired harvesting or cutting height for the header 100.

As the harvester 10 is propelled forwardly over the field with the standing crop 14, the plant materials are severed from the stubble by a sickle bar 102 at the front of the header 100 and delivered by a header auger 104 to the front end 42 of the feeder 40. A feeder conveyor 50 supported by a feeder frame 51 transports the harvested plant materials from the front end 42 of the feeder 40 to the threshing and separating assembly 46. As is generally understood, the threshing and separating assembly 46 may include a cylindrical chamber 52 in which the rotor 18 is rotated to thresh and separate the harvested plant materials received therein. That is, the harvested plant materials are rubbed and beaten between the rotor 18 and the inner surfaces of the chamber 52, whereby the crop materials (e.g., grain, seed, or the like) are is loosened and separated from the straw of the plant materials.

The crop materials that have been separated by the threshing and separating assembly 46 may fall onto a crop cleaning assembly 54 of the plant processing system 32. In general, the crop cleaning assembly 54 may include a series of pans 56 and associated sieves 58. As is generally understood, the separated crop materials may be spread out via oscillation of the pans 56 and/or the sieves 58 and may eventually fall through apertures defined in the sieves 58. Additionally, a cleaning fan 60 may be positioned adjacent to one or more of the sieves 58 to provide an air flow through the sieves 58 that remove chaff and other impurities from the crop materials. For instance, the fan 60 may blow the impurities off of the crop materials for discharge from the harvester 10 through the outlet of a residue hood 62 positioned at the back end of the harvester 10. The cleaned crop materials passing through the sieves 58 may then fall into a trough of an auger 64, which may be configured to transfer the crop materials to an elevator 66 for delivery to the crop tank 18. Additionally, in one embodiment, a pair of tank augers 68 at the bottom of the crop tank 18 may be used to urge the cleaned crop materials sideways to an unloading tube 70 for discharge from the harvester 10.

Moreover, in several embodiments, the harvester 10 may include a residue spreader 72 configured to discharge the residue (e.g., the straw, chaff, impurities, and/or the like) from the residue hood 62 as the harvester 10 is moved across the field. For example, in one embodiment, the spreader 72 may include one or more spreader discs (not shown) configured to eject the residue from the residue hood 62, with such disc(s) being driven by an associated actuator(s) 74 (e.g., an electric motor(s)). As will be described below, the actuator(s) 74 may be configured to adjust the spread width of the residue (e.g., the lateral width of the stream of residue) being discharged from the harvester 10. However, it should be appreciated that residue spreader 72 may have any other suitable configuration.

Furthermore, as shown in FIG. 1, a plant yield sensor 202 may be provided in operative association with the feeder 40. As such, the plant yield sensor 202 may be configured to detect a parameter associated with the weight of the harvested plant materials being transported through the feeder 40 from the header 100 to the threshing and separating assembly 46. For example, in one embodiment, the plant yield sensor 202 may correspond to a weight sensor provided in operative association with the feeder conveyor 50, with such weight sensor being configured to detect the weight of the plant materials being transported by the feeder conveyor 50. In another embodiment, the plant yield sensor 202 may correspond to a load cell provided in operative association with the feeder frame 51, with such weight sensor being configured to detect the weight of header 100 and the plant materials present on within the 100. However, it should be appreciated that the plant yield sensor 202 may be provided in operative association with any other suitable component of the feeder 40 and/or be correspond to any other suitable type of sensing device configured to detect any other suitable parameter associated with the weight of the harvested plant materials being transported by the feeder 40. For example, in one embodiment, the plant yield sensor 202 may correspond to a torque sensor configured to detect the operating torque of one or more rollers 76, 78 of the feeder conveyor 50. Furthermore, as will be described below, a plant yield sensor 202 may be provided in operative association with the header 100 in addition to or as an alternative to the plant yield sensor 202 provided in operative association with the feeder 40.

In several embodiments, the harvester 10 may also include a crop yield sensor 204 configured to detect a parameter associated with the weight of crop materials removed from the harvested plant materials by the plant processing system 32. For example, as shown in FIG. 1, in one embodiment, the crop yield sensor 204 may be provided in operative association with the crop tank 18. In such embodiment, the crop yield sensor 204 may include a crop flow sensing device 206, such as a flow meter, configured to detect the flow rate of the crop materials being delivered to the crop tank 18 by the elevator 66. Additionally, the crop yield sensor 204 may include a crop moisture sensing device 208, such as a humidity sensor, configured to detect the moisture present within the crop materials stored in the crop tank 18. As will be described below, the flow rate and the moisture of the crop materials may collectively be indicative of the weight of the crop materials separated from the harvested plant materials. However, it should be appreciated that, in alternative embodiments, the crop yield sensor 204 may correspond to and/or comprise any other suitable sensing device or combination of sensing devices configured to detect a parameter associated with the weight of crop materials removed from the harvested plant materials. Furthermore, the crop yield sensor 204 may be provided in operative association with any other suitable component of the harvester 10, such as the elevator 66.

Additionally, the harvester 10 may include one or more sensors 210, 212, 214 configured to detect one or more additional operating parameters of the harvester 10. For example, the harvester 10 may include a vehicle speed sensor 210 (e.g., a Hall Effect sensor) configured to detect the speed of the harvester 10 in the direction of travel 12. Moreover, the harvester 10 may include a feeder conveyor speed sensor 212 configured to detect the speed the feeder conveyor 50. The detected conveyor speed may be the rotational or linear speed of a belt of the feeder conveyor 50. In this regard, the vehicle speed sensor 210 and/or the feeder conveyor speed sensor 212 may correspond to Hall Effect sensors or any other suitable type of sensors configured to detect rotational speed. Furthermore, the harvester 10 may include an orientation sensor 214 configured to detect a parameter associated with the orientation of the harvester 10 relative to the ground 26. For example, in one embodiment, the sensor 214 may be configured to detect vertical movement of the harvester 10 relative to the ground 26, such as movement caused by field topography changes (e.g., bumps, depressions, and/or the like). As such, the orientation sensor 214 may correspond to a gyroscope, an inertial measurement unit (IMU), or any other suitable sensor configured to detect orientation changes.

Figure 2:
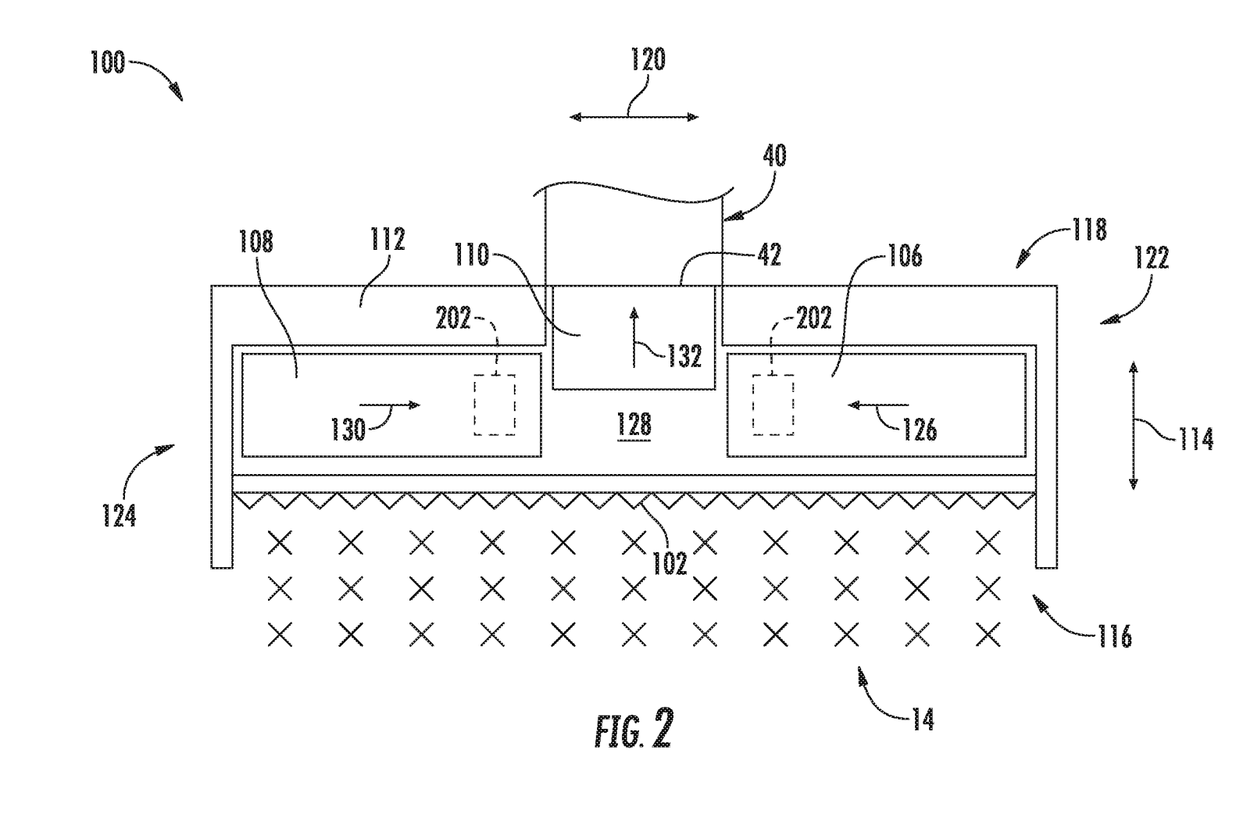
FIG. 2 illustrates a top view of one embodiment of a harvesting implement of an agricultural harvester in accordance with aspects of the present subject matter.

Referring now to FIG. 2, a top view of one embodiment of the header 100 described above with reference to FIG. 1 is illustrated in accordance with aspects of the present subject matter. As shown, in several embodiments, the header 100 may be configured as a draper header including conveyors 106, 108, 110 for transporting the harvested plant materials to the feeder 40. However, it should be appreciated that, in alternative embodiments, the header 100 may be configured as any other suitable type of header.

As shown in FIG. 2, the header 100 may include a header frame 112. In general, the frame 112 may extend along a longitudinal direction 114 between a forward end 116 and an aft end 118. The frame 112 may also extend along a lateral direction 120 between a first side 122 and a second side 124. In this respect, the frame 112 may be configured to support or couple to a plurality of components of the header 100. For example, the conveyors 106, 108, 110 and the header auger 104 (FIG. 1) may be supported by the frame 112. Additionally, the sickle bar 102 may be supported by and/or coupled to the frame 112.

As indicated above, the conveyors 106, 108, 110 may be configured to transport the harvested plant materials from the sickle bar 102 to the feeder 40. For example, as shown in FIG. 2, in one embodiment, laterally extending conveyors (e.g., a first lateral conveyor 106 and a second lateral conveyor 108) may be positioned adjacent to the first and second sides 122, 124 of the header frame 112, respectively. In this regard, the first lateral conveyor 106 may be configured to transport harvested plant materials laterally inward (e.g., as indicated by arrow 126 in FIG. 2) from the first side 122 of the frame 112 toward a laterally central portion 128 of the header 100. Similarly, the second lateral conveyor 108 may be configured to transport harvested plant materials laterally inward (e.g., as indicated by arrow 130 in FIG. 2) from the second side 124 of the frame 112 toward the laterally central portion 128. Additionally, a central conveyor 110 may be positioned laterally between the lateral conveyors 106, 108 such that the conveyor 110 is positioned at or proximate to the laterally central portion 128 of the header 100. As such, the central conveyor 110 may be configured to transport the plant materials provided to the laterally central portion 128 of the header 100 by the lateral conveyors 106, 108 to the front end 42 of the feeder 40 (e.g., as indicated by arrow 132 in FIG. 2). It should be appreciated that, in alternative embodiments, the header 100 may include any other suitable number of conveyor belts, such as more or fewer than three conveyor belts. Furthermore, it should be appreciated that the header 100 may be configured as any other suitable type of header.

Figure 3:
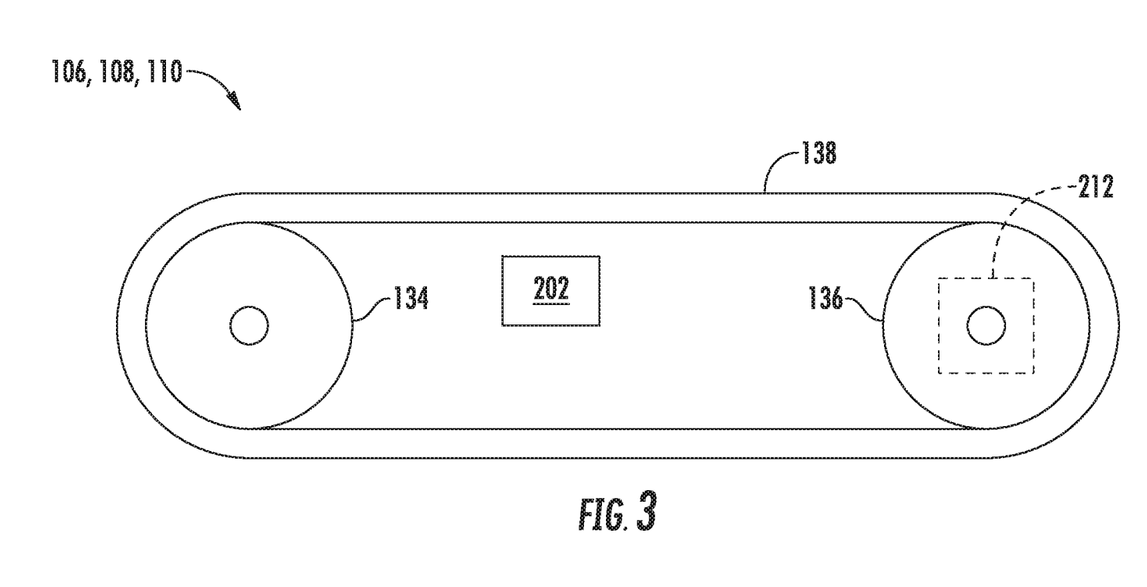
FIG. 3 illustrates a side view of one embodiment of a conveyor of harvesting implement of an agricultural harvester in accordance with aspects of the present subject matter, particularly illustrating various sensors provided in operative association with the conveyor.

FIG. 3 illustrates a schematic view of one embodiment of a suitable configuration for one or more of the conveyors 106, 108, 110 of the header 100 described above with reference to FIG. 2 in accordance with aspects of the present subject matter. As indicated above, the conveyors 106, 108, 110 may be supported by the header frame 112. As shown in FIG. 3, each conveyor 106, 108, 110 may include a pair of rollers 134, 136 configured to rotatably support an associated conveyor belt 138 relative to the header frame 112. As such, each conveyor belt 138 may be configured to be wrapped around or otherwise engage the corresponding rollers 134, 136 such that the direction of travel of each conveyor belt 138 changes (e.g., reverses direction) as such conveyor belt 138 engages or wraps around each corresponding rollers 134, 136. Furthermore, at least one of the rollers 134, 136 may be configured to rotatably drive the corresponding conveyor belt 138 such that the harvested plant materials are moved in the corresponding conveyor direction 126, 130, 132 (FIG. 2). It should be appreciated that, in other embodiments, each conveyor 106, 108, 110 may include additional rollers positioned between the opposed end rollers 134, 136 to support portions of the conveyor belt 138 positioned between the rollers 134, 136 along the length of each conveyor 106, 108, 110.

As indicated above, in several embodiments, one or more plant yield sensors 202 may be provided in operative association with the header 100. As such, the plant yield sensor(s) 202 may be configured to detect a parameter(s) associated with the weight of the harvested plant materials being ingested by the header 100. Specifically, in one embodiment, the plant yield sensor(s) 202 may correspond to a weight sensor(s), such as a load cell(s), provided in operative association with one or more of the conveyors 106, 108, 110, with each weight sensor being configured to detect the weight of the plant materials being transported by the associated conveyor 106, 108, 110. For example, in such embodiment, the weight of the harvested plant materials may compress the conveyor belt 138 against the weight sensor(s). In one embodiment, as shown in FIG. 2, one plant yield sensor 202 may be provided in operative association with the first lateral conveyor 106, and another plant yield sensor 202 may be provided in operative association with the second lateral conveyor 108. In such embodiment, each plant yield sensor 202 may be configured to detect the weight of the plant materials on its respective conveyor 106, 108 such that the weight of all of the plant materials being ingested by the header 100 is detected. In another embodiment, a single plant yield sensor 202 may be provided in operative association with the central conveyor 110 to detect the weight of all of the plant materials being ingested by the header 100. However, it should be appreciated that the plant yield sensor(s) 202 may be provided in operative association with any other suitable component of the header 100 and/or be correspond to any other suitable type of sensing device(s) configured to detect any other suitable parameter(s) associated with the weight of the harvested plant materials being ingested by the harvester 10. For example, in one embodiment, the plant yield sensor(s) 202 may correspond to a torque sensor(s) configured to detect the operating torque(s) of one or more rollers 134, 134 of the conveyors 106, 108, 110.

Additionally, in one embodiment, the header 100 may include one or more conveyor speed sensors 212 configured to detect the speed of one or more of the conveyors 106, 108, 110. The detected conveyor speed(s) may be the rotational or linear speed(s) of the belt(s) 138 of the corresponding conveyor 106, 108, 110. In this regard, each conveyor speed sensor 212 may correspond to a Hall Effect sensor or any other suitable type of sensing device configured to detect rotational speed.

It should be further be appreciated that the configurations of the harvester 10 and the header 100 described above and shown in FIGS. 1 through 3 are provided only to place the present subject matter in an exemplary field of use. Thus, it should be appreciated that the present subject matter may be readily adaptable to any manner of harvester and/or header configuration.

Figure 4:
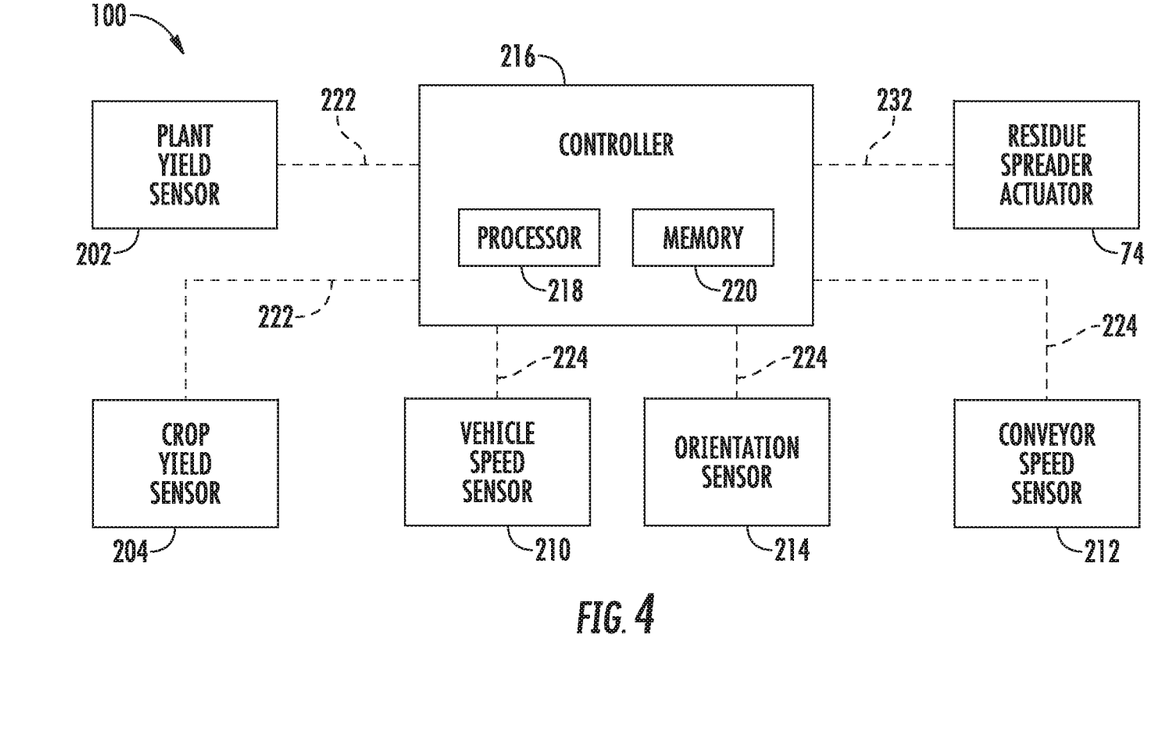
FIG. 4 illustrates a schematic view of one embodiment of a system for determining the residue yield of plant materials being harvested by an agricultural harvester in accordance with aspects of the present subject matter.

Referring now to FIG. 4, a schematic view of one embodiment of a system 100 for determining the residue yield of plant material being harvested by an agricultural harvester is illustrated in accordance with aspects of the present subject matter. In general, the system 100 will be described herein with reference to the harvester 10 and header 100 described above with reference to FIGS. 1 through 3. However, it should be appreciated by those of ordinary skill in the art that the disclosed system 100 may generally be utilized with harvesters having any other suitable harvester configuration and/or harvesting implements having any other suitable implement configuration.

As shown in FIG. 4, the system 200 may include various components of the harvester 10. For example, in several embodiments, the system 200 may include the plant yield sensor(s) 202. For example, as indicated above, the system 200 may, in one embodiment, include one plant yield sensor 202 provided in operative association with the first lateral conveyor 106 of the header 100 and another plant yield sensor 202 provided in operative association with the second lateral conveyor 108 of the header 100. In another embodiment, the system 200 may include one plant yield sensor 202 provided in operative association with the central conveyor 110 of the header 100. In a further embodiment, the system 200 may include one plant yield sensor 202 provided in operative association with the feeder conveyor 50. However, it should be appreciated that the system 200 may include any other suitable number of plant yield sensors 202. Furthermore, the system 200 may include the crop yield sensor 204, the vehicle speed sensor 210, the conveyor speed sensor 212, and/or the orientation sensor 214 described above with reference to FIGS. 1-3. Additionally, the system 200 may the residue spreader actuator 74 of the residue spreader 72 (FIG. 1). However, it should be appreciated that, in alternative embodiments, the system 200 may include any other suitable components of the harvester 10.

In accordance with aspects of the present subject matter, the system 200 may also include a controller 216 configured to electronically control the operation of one or more components of the harvester 10. In general, the controller 216 may comprise any suitable processor-based device known in the art, such as a computing device or any suitable combination of computing devices. Thus, in several embodiments, the controller 216 may include one or more processor(s) 218 and associated memory device(s) 220 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 220 of the controller 216 may generally comprise memory element(s) including, but not limited to, a computer readable medium (e.g., random access memory (RAM)), a computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 220 may generally be configured to store suitable computer-readable instructions that, when implemented by the processor(s) 218, configure the controller 216 to perform various computer-implemented functions, such as one or more aspects of the method 300 described below with reference to FIG. 6. In addition, the controller 216 may also include various other suitable components, such as a communications circuit or module, one or more input/output channels, a data/control bus and/or the like.

It should be appreciated that the controller 216 may correspond to an existing controller of the harvester 10 or the controller 216 may correspond to a separate processing device. For instance, in one embodiment, the controller 216 may form all or part of a separate plug-in module that may be installed within the harvester 10 to allow for the disclosed system and method to be implemented without requiring additional software to be uploaded onto existing control devices of the harvester 10.

In several embodiments, the controller 216 may be configured to determine the weight of plant materials being ingested by or otherwise entering the harvester 10. Specifically, as shown in FIG. 4, the controller 216 may be communicatively coupled to the plant yield sensor(s) 202 via a wired or wireless connection to allow measurement signals (e.g., indicated by dashed line 222 in FIG. 4) to be transmitted from the plant yield sensor(s) 202 to the controller 216. For instance, the controller 216 may include a look-up table or suitable mathematical formula stored within its memory 220 that correlates the sensor measurements to the amount of the plant materials entering the harvester 10. In embodiments in which the system 200 includes separate sensors 202 provided in operative association with the laterally extended header conveyors 106 and 108, the controller 216 may be configured to sum the amounts of plant materials determined based on measurement signals 222 received from each sensor 202.

Additionally, the controller 216 may be configured to determine the weight of crop materials removed from the ingested plant materials by the plant processing system 32. Specifically, as shown in FIG. 4, the controller 216 may be communicatively coupled to the crop yield sensor 204 via a wired or wireless connection to allow measurement signals 222 to be transmitted from the crop yield sensor 204 to the controller 216. For instance, the controller 216 may include a look-up table or suitable mathematical formula stored within its memory 220 that correlates the sensor measurements to the amount of the crop materials entering the crop tank 16. In one embodiment, such look-up table or mathematical formula may correlate the crop flow rate measurements (e.g., from the crop flow sensing device 206) and the crop moisture measurements (e.g., from crop moisture sensing device 208) to the amount of the crop materials entering the crop tank 16.

Additionally, in one embodiment, the controller 216 may be configured to determine the speed at which the harvester 10 is moved in the direction of travel 12. Specifically, as shown in FIG. 4, the controller 216 may be communicatively coupled to the vehicle speed sensor 210 via a wired or wireless connection to allow measurement signals (e.g., as indicated by dashed lines 224 in FIG. 4) to be transmitted from the vehicle speed sensor 210 to the controller 216. For instance, the controller 216 may include a look-up table or suitable mathematical formula stored within its memory 220 that correlates the sensor measurements to the vehicle speed of the harvester 10.

Moreover, the controller 216 may also be configured to determine the speed of one or more of the conveyors 50, 206, 208, 210. Specifically, as shown in FIG. 4, the controller 216 may be communicatively coupled to the conveyor speed sensor(s) 212 via a wired or wireless connection to allow measurement signals 224 to be transmitted from the conveyor speed sensor(s) 212 to the controller 216. For instance, the controller 216 may include a look-up table or suitable mathematical formula stored within its memory 220 that correlates the sensor measurements to the conveyor speed(s) of the conveyors 50, 206, 208, 210.

Furthermore, in one embodiment, the controller 216 may be configured to determine vertical movement of the harvester 10 relative to the ground 26. Specifically, as shown in FIG. 4, the controller 216 may be communicatively coupled to the vehicle orientation sensor 214 via a wired or wireless connection to allow measurement signals 224 to be transmitted from the orientation sensor 214 to the controller 216. For instance, the controller 216 may include a look-up table or suitable mathematical formula stored within its memory 220 that correlates the sensor measurements to the vertical movement of the harvester 10.

In one embodiment, the controller 216 may be further configured to filter one or more components of the measurement signals 224 received from plant yield sensor(s) 202 and/or the crop yield sensor 204 before determining the associated plant and crop yields. Such measurement signal components may generally be associated with the operation of the harvester 10 and may impact the accuracy of the plant and crop yield determinations. For example, such measurement signal components may include the speed at which the harvester 10 moves in the direction of travel, the speed of one or more of the conveyors 50, 106, 108, 110, and/or the vertical movement of the harvester 10 relative to the ground 26. As such, the controller 216 may use one or more suitable filtering techniques, such as one or more software-based filters (e.g., suitable algorithms or formulas) stored within its memory 220, which filter or remove such components from the measurement signals 224. For example, such filtering techniques may include high pass filtering, low pass filtering, band pass filtering, Butterworth filtering, and/or or combinations of such filtering techniques. It should be appreciated that, in alternative embodiments, the controller 216 may be configured to determine the plant and crop yields based on the raw measurement signals 224 received from the plant and crop yield sensors 202, 204.

In accordance with aspects of the present subject matter, the controller 216 may be configured to determine a residue yield value by comparing the determined plant and crop yields. For example, in one embodiment, the controller 216 may be configured to subtract the determined weight of the crop materials entering the crop tank from the determined overall weight of the plant materials entering the header, with the difference therebetween being indicative of the residue yield. However, it should be appreciated that, in alternative embodiments, the controller 216 may be configured to determine the residue yield in any other suitable manner from the determined plant and crop yields.

In one embodiment, the monitored residue yield value of may correspond to an instantaneous value of the amount of the residue being discharged by the harvester 10. More specifically, as is generally understood, the amount of residue present in the plant materials produced by the standing crop 14 may vary as the harvester 10 is moved across the field. In such embodiment, the controller 216 may be configured to continuously receive the measurement signals 222 from the plant and crop yield sensors 202, 204 as the harvester 10 is moved through the field. As such, the controller 216 may be configured to continuously update the determined residue yield value based on the subsequently received measurement signals 222.

Additionally, the controller 216 may be configured to create a residue yield map based on the determined amount of residue being discharged by the harvester 10. In general, the residue yield map may provide an indication of the amount of residue present at one or more geographical or physical location within the field. As such, the controller 216 may be configured to associate the determined residue yield being discharged by the harvester 10 with the current location or position of the harvester 10 (e.g., as determined by a GPS receiver or other location sensor (not shown)) within the field.

Figure 5:
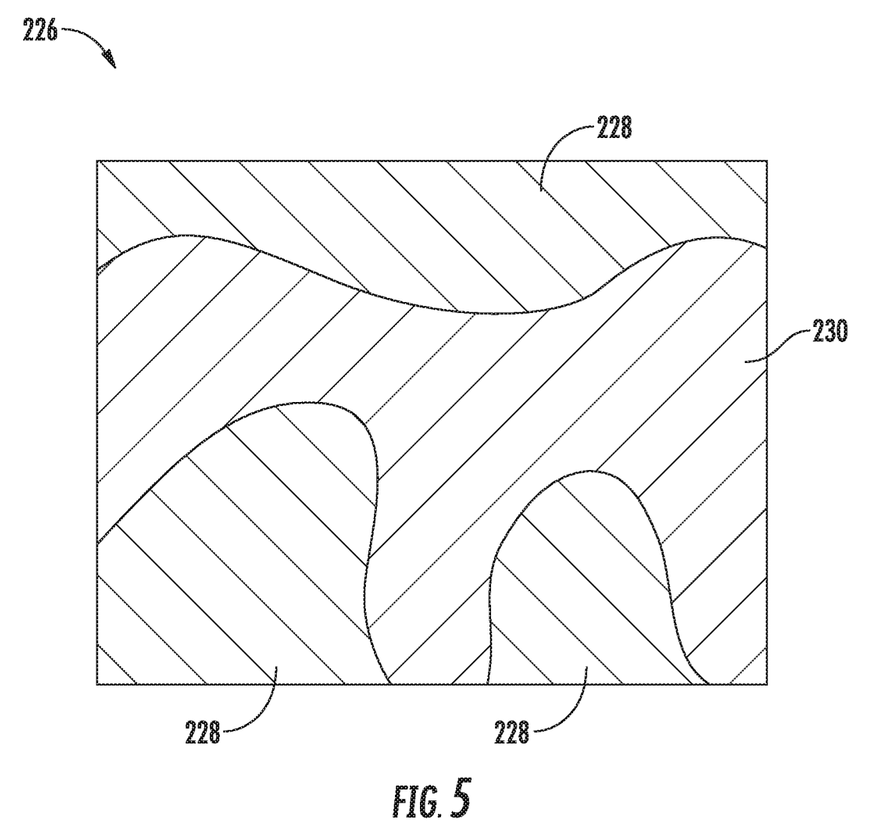
FIG. 5 illustrates an example residue yield map in accordance with aspects of the present subject matter.

FIG. 5 illustrates an example plant yield map 226 in accordance with aspects of the present subject matter. As shown, the determined residue yield value may vary at different locations within the field. For instance, in the example map 226 of FIG. 5, it may be assumed that regions 228 of the field have a greater determined residue yield value than regions 230 of the field. As such, the regions 228, 230 may be depicted with different colors or other visual indicators indicative of their varying determined residue yield values. For example, the regions 228 may be identified by red, while the regions 230 may be identified by yellow. In this regard, it should be appreciated that the colors corresponding to the various determined residue yield values in the map 226 of FIG. 5 may be indicative of the determined residue yield values associated with those particular locations within the field. For example, in one embodiment, low determined residue yield values may be associated with yellow, and high determined residue yield values may be associated with red.

In accordance with aspects of the present subject matter, the controller 216 may also be configured to initiate a control action associated with adjusting one or more operating parameters of the harvester 10 based on the determined residue yield value(s). More specifically, as mentioned above, the monitored amount of residue discharged from the harvester 10 may vary throughout the field. As such, in several embodiments, the controller 216 may be configured to adjust one or more of the harvester's operating parameters based on variations in the determined residue yield value over time as the harvester 10 is moved through the field. For example, when the determined residue yield value increases, the controller 216 may be configured to adjust one or more operating parameters in a manner that permits the harvester 10 to increase the area over which the residue is spread. Conversely, when the determined residue yield value decreases, the controller 216 may be configured to adjust one or more operating parameters in a manner that permits the harvester 10 to decrease the area over which the residue is spread.

In several embodiments, the controller 216 may be configured to adjust one or more operating parameters associated with the residue spreader 72 based on the determined residue yield. Specifically, as shown in FIG. 4, the controller 216 may be communicatively coupled to the actuator 74 of the residue spreader 72 via a wired or wireless connection to allow control signals (e.g., indicated by dashed lines 232 in FIG. 4) to be transmitted from the controller 216 to the residue spreader actuator 74. Such control signals 232 may be configured to instruct the residue spreader actuator 74 to increase the speed at which the residue spreader discs rotate to change the spread width of the residue discharged from the harvester 10. For example, when the determined residue yield value increases, the control signals 232 may instruct the residue spreader actuator 74 to increase the speed of the discs such that the spread width of the residue is increased. Conversely, when the determined residue yield amount value decreases, the control signals 232 may instruct the residue spreader actuator 74 to decrease the speed of the discs such that the spread width of the residue is decreased. However, it should be appreciated that, in alternative embodiments, the controller 216 may be configured to transmit control signals 232 to any other suitable component of the harvester 10 such that the spread width of the residue discharged from of the harvester 10 is adjusted.

Figure 6:
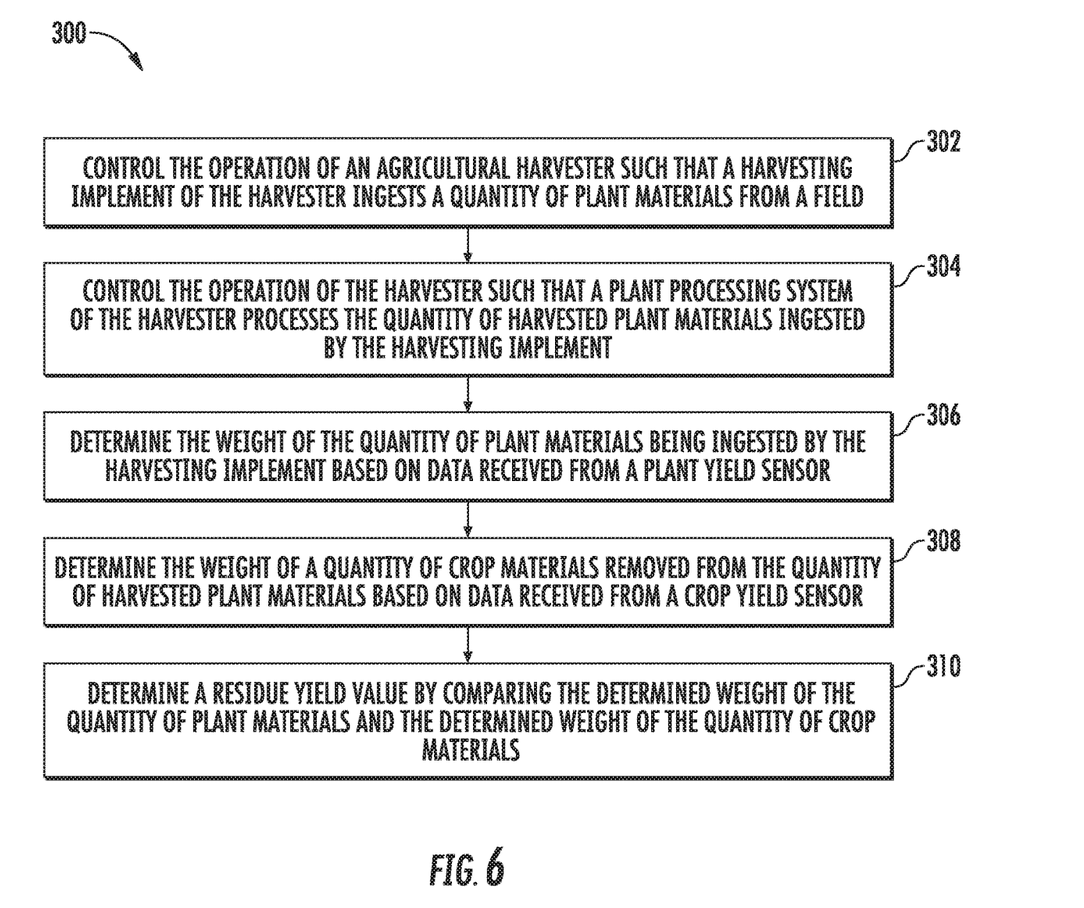
FIG. 6 illustrates a flow diagram of one embodiment of a method for determining the residue yield of plant materials being harvested by an agricultural harvester in accordance with aspects of the present subject matter.

Referring now to FIG. 6, a flow diagram of one embodiment of a method 300 for determining the residue yield of plant material being harvested by an agricultural harvester is illustrated in accordance with aspects of the present subject matter. In general, the method 300 will be described herein with reference to the agricultural harvester 10, the header 100, and the system 200 described above with reference to FIGS. 1 through 5. However, it should be appreciated by those of ordinary skill in the art that the disclosed method 300 may generally be utilized to determine the residue yield of plant material being harvested by any harvester having any suitable harvester configuration and/or any harvesting implement having any suitable implement configuration and/or in connection with any system having any suitable system configuration. In addition, although FIG. 6 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 6, at (302), the method 300 may include controlling, with a computing device, the operation of the agricultural harvester such that a harvesting implement of the harvester ingests a quantity of plant materials from a field. For instance, as described above, the controller 216 may be configured to control the operation of the header 100 of the harvester 10 such that the header 100 ingests plant materials from the field.

Additionally, at (304), the method 300 may include controlling, with a computing device, the operation of the agricultural harvester such that a plant processing system of the harvester processes the quantity of harvested plant materials ingested by harvesting implement. For instance, as described above, the controller 216 may be configured to control the operation of the plant processing system 32 of the harvester 10 such that the plant processing system 32 processes the harvested plant materials ingested by harvesting implement 100, thereby separating the crop materials from the associated residue.

Moreover, as shown in FIG. 6, at (306), the method 300 may include determining, with the computing device, a weight of the quantity of plant materials being ingested by the harvesting implement based on data received from a plant yield sensor. For instance, as described above, the controller 216 may be communicatively coupled to the plant yield sensor(s) 202 configured to capture data 222 indicative of the weight of plant materials currently being ingested by the harvester 10. As such, data 222 transmitted from the plant yield sensor(s) 202 may be received by the controller 216 and subsequently analyzed and/or processed to determine the weight of plant materials being ingested.

Furthermore, at (308), the method 300 may include determining, with the computing device, the weight of a quantity of crop removed from the quantity of harvested plant materials based on data received from a crop yield sensor. For instance, as described above, the controller 216 may be communicatively coupled to the crop yield sensor 204 configured to capture data 222 indicative of the weight of crop materials separated from the harvested plant materials by the plant processing system 32 of the harvester 10. As such, data 222 transmitted from the crop yield sensor 204 may be received by the controller 216 and subsequently analyzed and/or processed to determine the weight of crop materials removed from the plant materials.

Additionally, as shown in FIG. 6, at (310), the method 300 may include determining, with the computing device, a residue yield value by comparing the determined weight of the quantity of plant materials and the determined weight of the quantity of crop materials. For instance, as described above, the controller 216 may be configured to subtract the determined weight of the crop materials from the determined weight of plant materials, with the difference therebetween being indicative of the residue yield.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. An agricultural harvester, comprising:
   a harvesting implement configured to ingest a quantity of plant materials from a field;
   a plant processing system configured to process the quantity of harvested plant materials ingested by harvesting implement; and
   a system for determining a residue yield of the plant materials ingested by the harvesting implement, the system comprising:
      a plant yield sensor configured to detect a parameter associated with a weight of the harvested plant materials being ingested by the harvesting implement;
      a crop yield sensor configured to detect a parameter associated with a weight of a quantity of crop materials removed from the quantity of harvested plant materials by the plant processing system; and
      a controller communicatively coupled to the plant and the crop yield sensors, the controller being configured to:
         determine the weight of the quantity of plant materials being ingested by the harvesting implement based on measurement signals received from the plant yield sensor;
         determine the weight of the quantity of crop materials removed from the quantity of harvested plant materials based on measurement signals received from the crop yield sensor; and
         determine a residue yield value by comparing the determined weight of the quantity of plant materials and the determined weight of the quantity of crop materials.

2. The agricultural harvester of claim 1, further comprising:
   a feeder configured to transfer the quantity of harvested plant materials from the harvesting implement to the plant processing system, the plant yield sensor being provided in operative association with at least one of the harvesting implement or the feeder.

3. The agricultural harvester of claim 2, wherein the plant yield sensor is provided in operative association with at least one of a harvesting implement conveyor, a feeder conveyor, or a feeder frame.

4. The agricultural harvester of claim 3, wherein the plant yield sensor corresponds to a weight sensor configured to detect the weight of the harvested plant materials present on the harvesting implement conveyor or the feeder conveyor.

5. The agricultural harvester of claim 1, wherein the determined residue yield value corresponds to an instantaneous residue yield value, the controller being further configured to continuously update the determined residue yield value based on the measurement signals received from the plant and crop yield sensors.

6. The agricultural harvester of claim 1, wherein the controller is further configured to initiate a control action associated with adjusting an operating parameter of the agricultural harvester based on the determined residue yield value.

7. The agricultural harvester of claim 6, wherein the operating parameter corresponds to a spread width of residue being discharged by the agricultural harvester.

8. The agricultural harvester of claim 6, wherein the controller is further configured to adjust the operating parameter based on variations in the residue yield value with time as the agricultural harvester is moved through the field.

9. The agricultural harvester of claim 1, wherein the controller is further configured to filter a component of the measurement signals associated with an operation of the agricultural harvester from the measurement signals received from plant yield sensor.

10. The agricultural harvester of claim 9, wherein the component corresponds to at least one of a speed of the agricultural harvester relative to the field, a vertical movement of the agricultural harvester relative to the field, a speed of a conveyor of the harvesting implement, or a speed of a conveyor of a feeder.

11. A method for determining a residue yield of plant material being harvested by an agricultural harvester, the agricultural harvester including a harvesting implement configured to ingest a quantity of plant materials from a field and a plant processing system configured to process the quantity of harvested plant materials ingested by harvesting implement, the method comprising:
controlling, with a computing device, an operation of the agricultural harvester such that a harvesting implement of the harvester ingests a quantity of plant materials from a field and a plant processing system of the harvester processes the quantity of harvested plant materials ingested by harvesting implement;
determining, with the computing device, a weight of the quantity of plant materials being ingested by the harvesting implement based on data received from a plant yield sensor;
determining, with the computing device, a weight of a quantity of crop removed from the quantity of harvested plant materials based on data received from a crop yield sensor; and
determining, with the computing device, a residue yield value by comparing the determined weight of the quantity of plant materials and the determined weight of the quantity of crop.

12. The method of claim 11, wherein the determined residue yield value corresponds to an instantaneous residue yield value, the method further comprising:
continuously updating, with the computing device, the determined residue yield value based on the data received from the plant and crop yield sensors.

13. The method of claim 11, further comprising:
initiating, with the computing device, a control action associated with adjusting an operating parameter of the agricultural harvester based on the determined residue yield value.

14. The method of claim 13, further comprising:
adjusting, with the computing device, the operating parameter based on variations in the residue yield value with time as the agricultural harvester is moved through the field.

15. The method of claim 11, further comprising:
filtering, with the computing device, a component of the data associated with an operation of the agricultural harvester from the data received from plant yield sensor.

16. A system for determining a residue yield of the plant materials ingested by a harvesting implement of an agricultural harvester, the system comprising:
a plant yield sensor configured to detect a parameter associated with a weight of the harvested plant materials being ingested by the harvesting implement;
a crop yield sensor configured to detect a parameter associated with a weight of a quantity of crop materials removed from the quantity of harvested plant materials by a plant processing system of the agricultural harvester; and
a controller communicatively coupled to the plant and the crop yield sensors, the controller being configured to:
determine the weight of the quantity of plant materials being ingested by the harvesting implement based on measurement signals received from the plant yield sensor;
determine the weight of the quantity of crop materials removed from the quantity of harvested plant materials based on measurement signals received from the crop yield sensor; and
determine a residue yield value by comparing the determined weight of the quantity of plant materials and the determined weight of the quantity of crop materials.

17. The system of claim 16, wherein the plant yield sensor is provided in operative association with at least one of the harvesting implement or a feeder of the agricultural harvester.

18. The system of claim 17, wherein the plant yield sensor is provided in operative association with at least one of a harvesting implement conveyor, a feeder conveyor, or a feeder frame.

19. The system of claim 18, wherein the plant yield sensor corresponds to a weight sensor configured to detect the weight of the harvested plant materials present on the harvesting implement conveyor or the feeder conveyor.

20. The system of claim 16, wherein the determined residue yield value corresponds to an instantaneous residue yield value, the controller being further configured to continuously update the determined residue yield value based on the measurement signals received from the plant and crop yield sensors.

21. The system of claim 16, wherein the controller is further configured to initiate a control action associated with adjusting an operating parameter of the agricultural harvester based on the determined residue yield value.

22. The system of claim 21, wherein the operating parameter corresponds to a spread width of residue being discharged by the agricultural harvester.

23. The system of claim 21, wherein the controller is further configured to adjust the operating parameter based on variations in the residue yield value with time as the agricultural harvester is moved through a field.

24. The system of claim 16, wherein the controller is further configured to filter a component of the measurement signals associated with an operation of the agricultural harvester from the measurement signals received from the plant yield sensor.

25. The system of claim 24, wherein the component corresponds to at least one of a speed of the agricultural harvester relative to a field, a vertical movement of the agricultural harvester relative to the field, a speed of a conveyor of the harvesting implement, or a speed of a conveyor of a feeder.

\* \* \* \* \*